United States Patent [19]

Yaoita

[11] Patent Number: 5,605,125
[45] Date of Patent: Feb. 25, 1997

[54] DIRECT FUEL INJECTION STRATIFIED CHARGE ENGINE

[76] Inventor: Yasuhito Yaoita, Yugen-Kaisha Royal Portrait 2-37-4, Kouenji Minami, Suginami-ku, Tokyo, 166, Japan

[21] Appl. No.: 383,844

[22] Filed: Feb. 6, 1995

[51] Int. Cl.$^6$ ........................................ F02B 3/00
[52] U.S. Cl. ........................ 123/275; 123/298; 123/661
[58] Field of Search ................................ 123/261, 275, 123/295, 661, 298

[56] References Cited

U.S. PATENT DOCUMENTS 2,587,339  2/1952  Levesque Du Rostu ............... 123/275

FOREIGN PATENT DOCUMENTS

| 63-1710 | 1/1988 | Japan . | |
|---|---|---|---|
| 63-120815 | 5/1988 | Japan . | |
| 63-162928 | 7/1988 | Japan . | |
| 768520 | 2/1957 | United Kingdom | 123/275 |

OTHER PUBLICATIONS

Waseda University Emeritus Prof. Takeashi Saito, The trade journal 'Nainen kikan' (Internal Combustion Engines), Tokyo, Sankai–dô Publishing, Dec. 1993, p. 10.

Satoshi Kato and Shigeru Onishi, Nainen kikan (Internal Combustion Engines), Tokyo, Sankai–dô Publishing, Jul. 1988, pp. 35 to 38, Stratified Charge Engine by Impingement of Fuel Jet (OSKA).

Satoshi Kato and Shigeru Onishi, SAE (Society of Automotive Engineers) No. 871689, New Mixture Formation Technology of Direct Fuel Stratified Combustion SI Engine (OSKA).

Nainen kiknen (Internal Combustion Engines), Tokyo, Sankai–dô Publishing, Jun. 1991, p. 29, Symposium on Diesel Engine Technology.

*Primary Examiner*—Noah P. Kamen

[57] ABSTRACT

A Stratified Charge Engine where the main combustion chamber is made into one part of the cylinder head is described. The main combustion chamber in this engine is smaller than in Pre-Mixture Combustion Engines. Other main features of this engines are direct fuel injection, installation of a squish area and prevention of combustion in the end-gas zone. The thermal load and the weight of the piston in this engine are lower than in normal Stratified Charge Engines with fuel jet impingement. The fuel jet is kept inside the main combustion chamber, resulting in an higher anti-knocking quality of this engine as compared to Pre-Mixture Combustion Engines.

5 Claims, 21 Drawing Sheets

DIRECT FUEL INJECTION STRATIFIED CHARGE ENGINE

BACKGROUND OF THE INVENTION

1. Field of the Invention

The present invention relates to the increase in the anti-knocking quality of Stratified Charge Engines by the use of a main combustion chamber with dimensions smaller than the diameter of the cylinder, direct fuel injection, installation of a squish area and prevention of combustion in the end-gas zone. In particular, the present invention relates to the reduction of the weight and the thermal load of the piston, the reduction of the thermal load of the protruding electrodes of a spark plug, and the reduction of the thermal load of the impingement surface of Stratified Charge Engines.

2. Description of the Related Art

Anti-knocking is generally held to be high in Texaco type combustion chambers, illustrated in FIG. 17, and in Watanabe type combustion chambers, illustrated in FIG. 18. These combustion chambers are basically swirl chambers. A swirl inside the combustion chamber (swirl chamber) disperses the directly injected fuel and mixture formation takes place inside the combustion chamber (swirl chamber).

However, according to the trade journal 'Nainen kikan' (Internal Combustion Engines, Tokyo, Sankai-do Publishing), December 1993, p.10, the kinetic energy of the fuel jet in these combustion (swirl chamber) chambers at full load condition becomes too high, and part of the fuel jet is swept away from the combustion chamber (swirl chamber) into the cylinder. The fuel jet washed into the cylinder burns imperfectly and maximum torque is decreased. In Nainen kikan (Internal Combustion Engines, Tokyo, Sankai-d Publishing), July 1988, page 35 to 38, a Stratified Charge Engine by Impingement of Fuel Jet is discussed (hereafter "Stratified Charge Engine by Impingement of Fuel Jet", both two-cycle and four-cycle types, will be abbreviated as OSKA).

As concerns OSKA, Japanese Patent Disclosures Showa 63-1710, Showa 63-120815 and Showa 63-162928 as well as SAE-871689 have to be mentioned.

Construction and working at ignition of OSKA are depicted and explained in FIG. 19.

In OSKA, during the compression stroke an injector 5 injects fuel towards an impingement surface 3, installed inside the main combustion chamber 1'. As a result, by the working of the squish flow, a mixture layer—marked by dot—is created only inside the main combustion chamber 1' at ignition.

In OSKA, the mixture washed into the squish area 2 at combustion stroke, is rarefied and combustion in the end-gas zone, where knocking is developed easily, becomes impossible.

Accordingly, anti-knocking is higher in OSKA than in Pre-Mixture Combustion Engines, where fuel is delivered into the inside of the inlet valve.

However, concerning OSKA the following five problems do exist:

(1) As the main combustion chamber in OSKA is made as a deep cavity into the top of the piston, the top surface of the piston in contact with the hot combustion gas, is increased and the thermal load of the piston is higher, than in Pre-Mixture Combustion Engines.

Also, in OSKA the whole of the edge 4 of the impinging surface 3 is protruding, and accordingly the thermal load of the impinging part is increased.

(2) The piston in OSKA is similar to the piston of Direct Fuel Injection Diesel Engines and accordingly longer and heavier than the piston of Pre-Mixture Combustion Engines.

(3) Additionally, at the end of the combustion stroke a squish flow consisting of air—is developed along the squish area 2. Therefore, between the inner wall of the combustion chamber at the cylinder head, and the mixture layer inside the main combustion chamber 1', a lean mixture layer 8, that cannot be combusted, is formed.

If the spark plug could be installed into the side wall of the main combustion chamber 1' at the top of the piston, then a normal spark plug electrode could be installed at the mixture layer. However, in this case, exchange of the spark plug is fairly difficult. Therefore, in OSKA the spark plug 6 is installed at the cylinder head near the injector 5. The electrode of the spark plug 6 is protruding into the mixture layers inside the main combustion chamber 1'. Accordingly, the thermal load of the spark plug electrode is increased.

(4) To achieve high outputs in internal combustion engines using overhead valves, a light piston and a high fuel intake efficiency at high rotational speed—this is to say, a high square measure for the installation of inlet valves—is necessary.

As shown in FIG. 20, which is a plan of the cylinder heads bottom, the spark plug 6 is installed in a way that the space left for the two valves 15 in FIG. 20 is considerably narrowed. The diameter d of the valves 15 in OSKA, as displayed in FIG. 20, is smaller than the diameter D of the valves 15 in Pre-mixture Combustion Engines, shown in FIG. 21. In OSKA engines using overhead valves, the highest possible square measure of the valves, and accordingly maximum output is smaller than in Pre-mixture Combustion Engines.

(5) Additionally, as the impinging part is projecting into the main combustion chamber 1', the construction of the combustion chamber in OSKA is complicated.

SUMMARY OF THE INVENTION

The purpose of this invention, a Stratified Charge Engine with a main combustion chamber with dimensions smaller than the diameter of the cylinder, is to achieve a higher anti-knocking quality than in Pre-Mixture Combustion Engines, by realizing at the same time the following five goals:

(1) Reduction of the thermal load of the piston and the impingement part as compared with OSKA.

(2) Lighter construction of the piston than in OSKA.

(3) Reduction of thermal load of the electrode of the spark plug as compared with OSKA.

(4) Higher possible output levels than in OSKA.

(5) Simpler construction of the combustion chamber than in OSKA.

BRIEF DESCRIPTIONS OF THE DRAWINGS

Other features and advantages of the invention will be apparent from the following descriptions, taken in connection with the accompanying drawings, wherein:

FIG. 1 is a cross sectional view of the preferred embodiment at the beginning of fuel injection. An impingement surface is made on the top of an impingement part, that protrudes into the main combustion chamber from the combustion chambers side wall aligned with the side wall of the cylinder. Also, the working of this preferred embodiment is depicted.

DETAILED DESCRIPTION OF THE PREFERRED EMBODIMENTS

Figure 1:
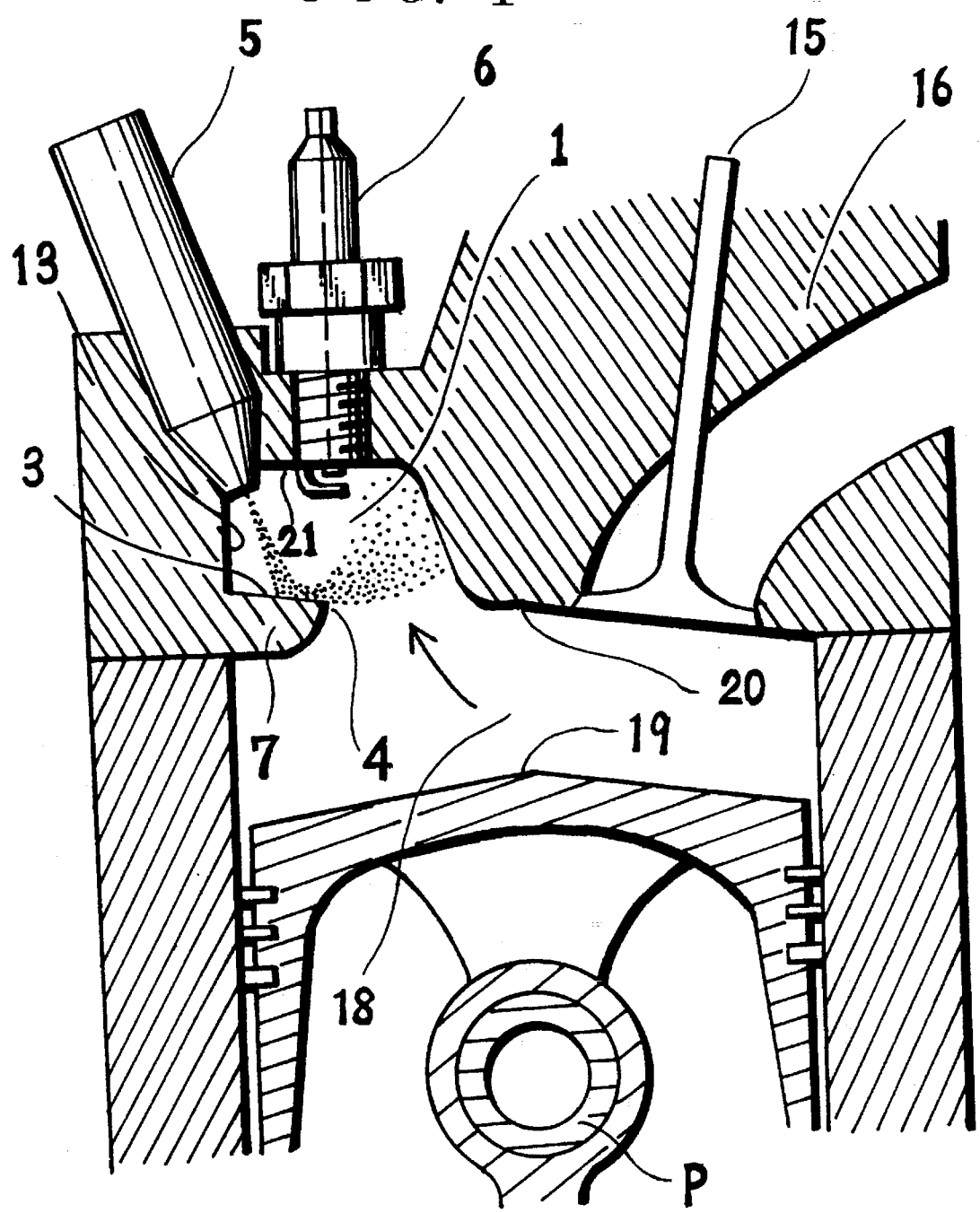
Figure 2:
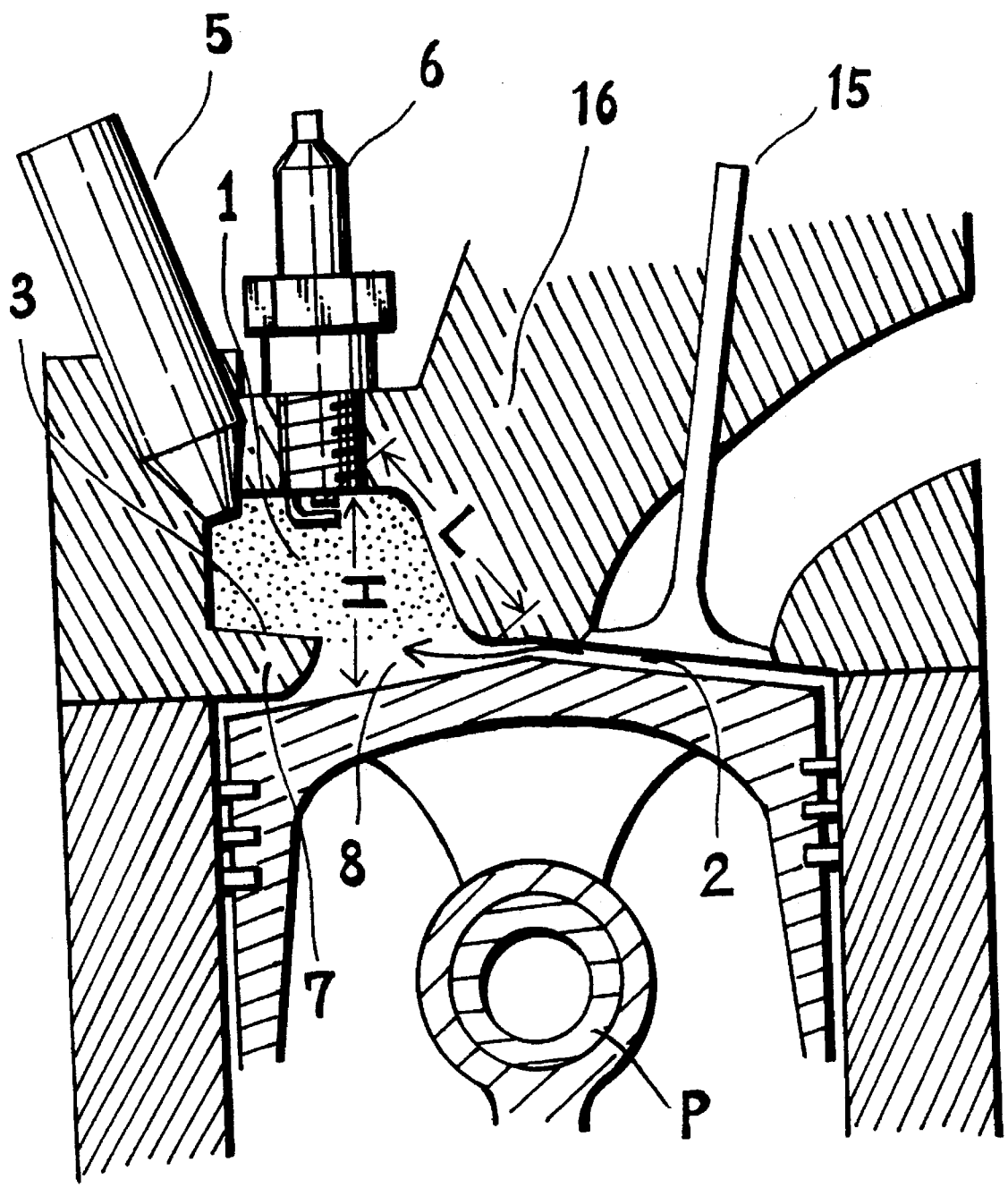
FIG. 2 is a cross sectional view of the preferred embodiment of FIG. 1 immediately before ignition.

First we explain the preferred embodiment shown in FIG. 1 and FIG. 2.

A cross sectional view of a Spark Ignited Internal Combustion Engine in the vicinity of the combustion chamber at fuel injection is shown in FIG. 1. FIG. 2 is a cross sectional view of the same preferred embodiment immediately before ignition.

The main combustion chamber 1 is located between one part 20 of the inner wall of the cylinder head 16, opposing the inside 18 of the cylinder, and the top 19 of the piston at the end of the compression stroke. On another part 20 of the wall of the cylinder head, the squish area 2 is situated. The form of the pistons top is optional. If the piston's top 19 is formed plain, the opposing wall 20 at the cylinder head, at the squish area, has to be formed accordingly.

An impingement surface 3 is made onto an impingement part 7, protruding from the side wall 13 of the main combustion chamber 1 that is aligned with the cylinder's side wall. An injector 5 is installed around the same side wall and is directed obliquely towards the impingement surface 3. Fuel injection at full load takes place during the compression stroke.

To realize dispersion of the fuel jet into the main combustion chamber 1 after impingement at the impingement surface 3, the inner space of the main combustion chamber is formed mainly around the area between the edge 4 of the impingement surface 3 and the squish area 2, in the flow direction of the fuel jet above the impingement surface 3. The edge 4 of the impingement surface 3 is bent sharply. The edge 4 of the impinging surface can either be rectangularly shaped or else with a sharply bent curve.

A spark plug 6 with a normal electrode is installed at the top 21 of the main combustion chamber 1, which is in contact with the mixture layer—marked with dots—at ignition, as shown in FIG. 2.

The size of the main combustion chamber 1 and the location of the spark plug are adjusted in such a way that the distance between the various parts of the inner walls of the main combustion chamber 1, and the electrode of the closest spark plug 6, is smaller than the radius of the cylinder. Particularly, in the case of a single spark plug, the distance L between the furthest part of the inner wall of the main combustion chamber 1 and the electrode of the spark plug 6, is smaller than the cylinders radius. Then, the height H of the main combustion chamber can be made higher than in Pre-Mixture Combustion Engines. The height H of the main combustion chamber has to be adjusted, so that the size of the main combustion chamber is suitable for a compression ratio with no knocking development.

The preferred embodiment of FIG. 1, a Stratified Charge Engine, can be either a 2-cycle type without overhead valves, or else a 2-cycle type or a 4-cycle type with overhead valves. In the latter case, the overhead valves 15 can either be installed outside the main combustion chamber, as shown in FIG. 1, or inside the main combustion chamber.

In the following, we will explain the working of the preferred embodiment, with reference to FIG. 2.

During the compression stroke, fuel is injected obliquely from the injector 5 towards the impingement surface 3. According to Nainen kikan (Internal Combustion Engines, Tokyo, Sankai-d Publishing), June 1991, page 29, in the case of oblique impingement, the fuel jet after impingement is dispersed mainly in flow direction. The density of the fuel Jet after impingement is reduced considerably and the tip of the fuel jet, similar to a carpet roll, includes air. Diffusivity of the fuel jet is increased. Due to impingement, the kinetic energy of the fuel jet is decreased. After dispersing from the impingement surface 3 and its edge 4 into the main combustion chamber 1, the fuel jet—at full load condition—follows the squish flow easily. By the working of the squish flow (marked with an arrow), the fuel jet (marked with dots) dispersing from the impingement surface 3 and its edge 4, is kept inside the main combustion chamber and churned and mixed there.

Immediately before ignition, the size of the squish area 2 is narrowed, and the squish flow (marked with an arrow) develops along the inner wall facing the squish area in the direction of the combustion chamber 1, as shown in FIG. 2. An incombustible lean mixture 8 between the top of the piston and the mixture layer of FIG. 2 forms. As a result of this process, layered compression inside the main combustion chamber is achieved.

The distance between the various parts of the inner walls of the combustion chamber 1 and the closest electrode of the spark plug 6, is smaller than the radius of the cylinder. Therefore, the time needed for the combustion of the mixture layer in the main combustion chamber 1 in FIG. 2 is shorter than the combustion time of the mixture inside the whole cylinder at ignition. Accordingly, the anti knocking quality of the preferred embodiment of FIG. 1 and FIG. 2—and OSKA—is higher than in Pre-Mixture Combustion Engines. As high compression ratios are realized, fuel costs are reduced.

The pressure in the main combustion chamber 1 is increasing during the combustion stroke and part of the fuel layer is spread into the squish area 2. However, combustion in the end-gas zone, where knocking is develops most easily, is impossible, as the mixture is rarefied by the air around the squish area and no knocking develops inside the end gas zone.

As no deep main combustion chamber is made into the top of the piston, the surface of the piston in contact with burned gas in the preferred embodiments of FIG. 1 and FIG. 2. is smaller than in OSKA. In Other words, the thermal load of the piston can be kept low and reliability is increased.

The main reason for upper speed limits in combustion engines is the weight of parts, like valves and pistons, undergoing reciprocating movements. In the present invention, no deep main combustion chamber is made into the pistons top. The part of the piston above the piston's base pin p—and therefore the whole piston—in the preferred embodiment is lighter than in OSKA.

Maximum output is related to upper limits of rotational speed and associated upper limits for the torque. The upper limit of the torque at high speed rotation is mainly related to limits of the square measure of intake valves.

In the 2-cycle type version of the preferred embodiment without overhead valves, no limit for the installation of inlet valves does exist. Therefore, high speeds become possible and the maximum output of the preferred embodiment is higher than in OSKA.

As the upper part of the piston is smaller in the preferred embodiment than in OSKA, the cylinder and the cylinder block can be constructed smaller and lighter. Also, the reliability of the electrode of the spark plug 6 in this preferred embodiment is higher than in OSKA, because the spark plug electrode is not protruding, as is the case in OSKA.

The present invention is a Stratified Charge Engine with a small main combustion chamber. Other main features of this engine are direct fuel injection, installation of a squish area, and prevention of combustion in the end-gas zone. The conditions for layer formation restricted only to the inside of the main combustion chamber 1 are realized in this engine by the use of direct fuel injection as well as by the installation of a squish area 2 and the use of the squish flow. The formation of fuel layers with high diffusivity only inside the main combustion chamber 1 can be realized by a modified main combustion chamber and use of a suitable diffusion process, both of which differ considerably from OSKA. The various embodiments of the present invention represent exemplars of Stratified Charge Engines with a main combustion chamber made into the cylinder head and a diffusion process different from OSKA.

Other preferred embodiments and their working will be discussed only in their main differences to the preferred embodiment of FIG. 1 and FIG. 2.

First, we will discuss modifications of the impingement surface 3 and its edge 4.

Figure 3:
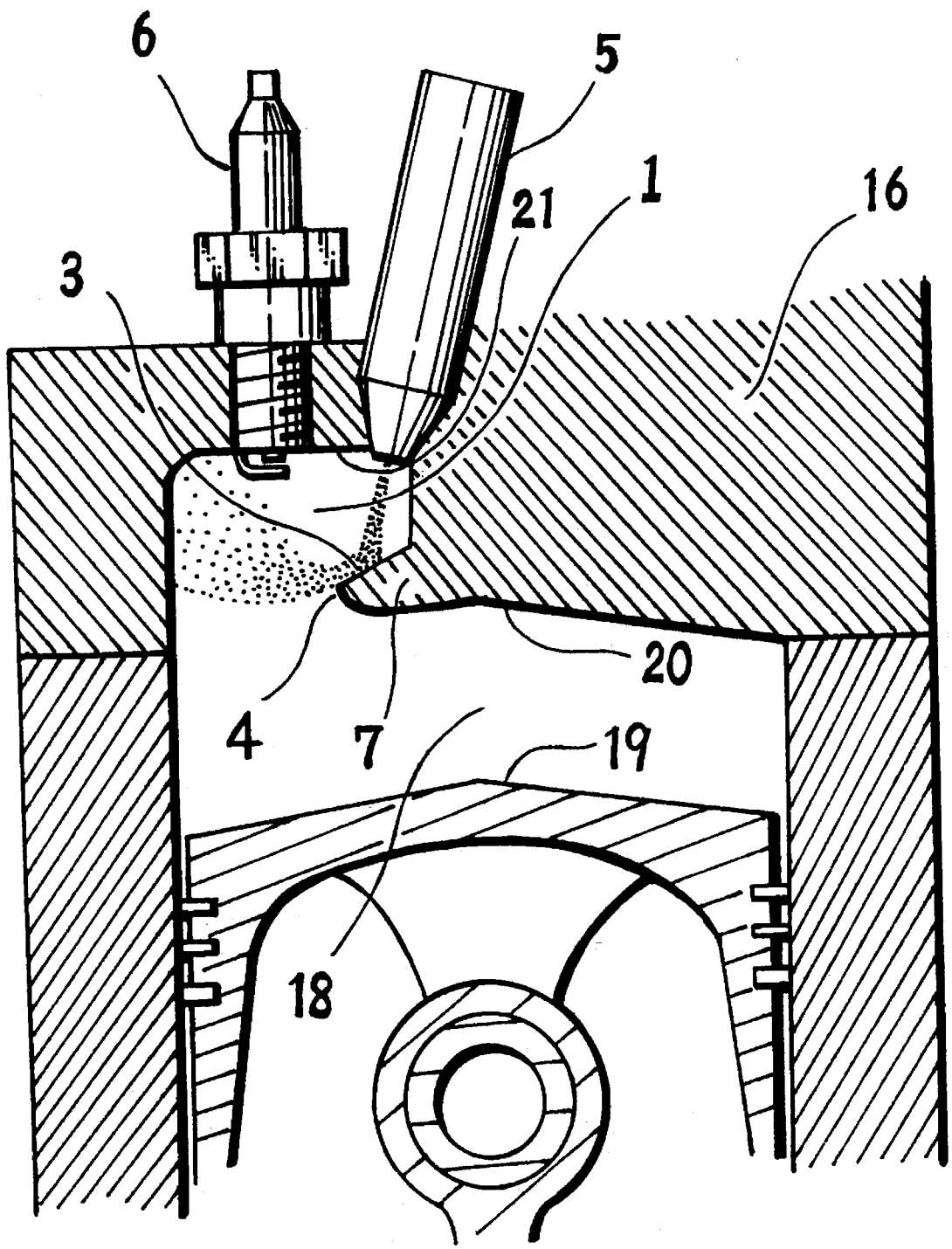
FIG. 3 is a cross sectional view of a preferred embodiment, where the impingement part is installed at the main combustion chambers side wall situated above the central axis of the cylinder.

A preferred embodiment, where impinging part 7, impingement surface 3, and edge 4 are protruding from the side wall of the main combustion chamber, located above the main axis of the cylinder, is shown in FIG. 3. In this preferred embodiment, the injector 5, is installed at the top wall 21 of the main combustion chamber 1, close to the main axis of the cylinder, and directed obliquely towards the impingement surface 3.

Figure 4:
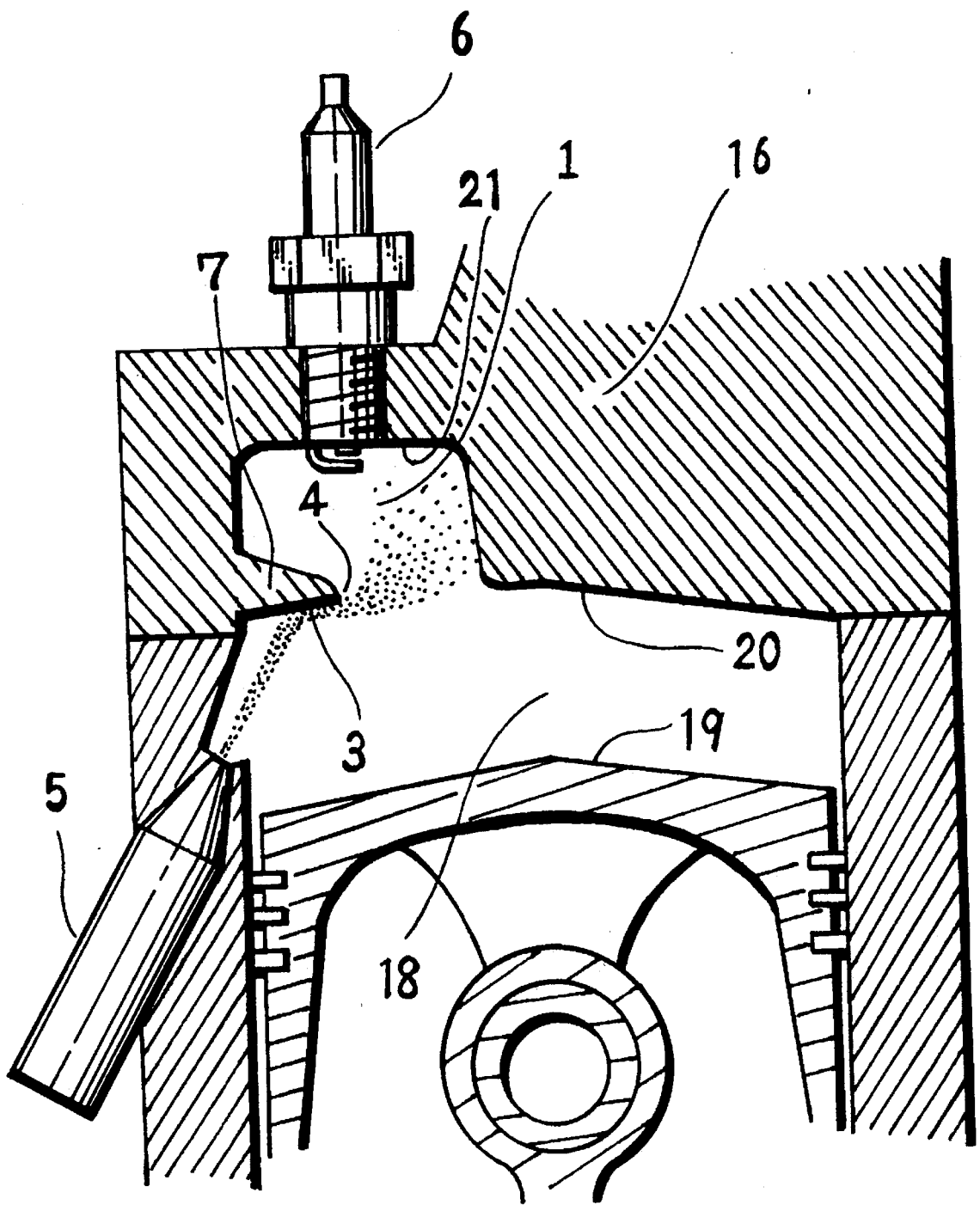
FIG. 4 is a cross sectional view of a preferred embodiment where the impingement surface is made on the underside of an impingement part, that is protruding from the side wall of the main combustion chamber aligned with the cylinders side wall.

A preferred embodiment, where the impingement surface 3 and its edge 4 are made at the underside of an impingement part 7, which is protruding from the side wall of the main combustion chamber aligned with the cylinder side wall is shown in FIG. 4. In this case, the injection hole of the injector 5 is made into one of the side walls of the upper part of the cylinder, and injection is directed obliquely towards the impingement surface 3.

Figure 5:
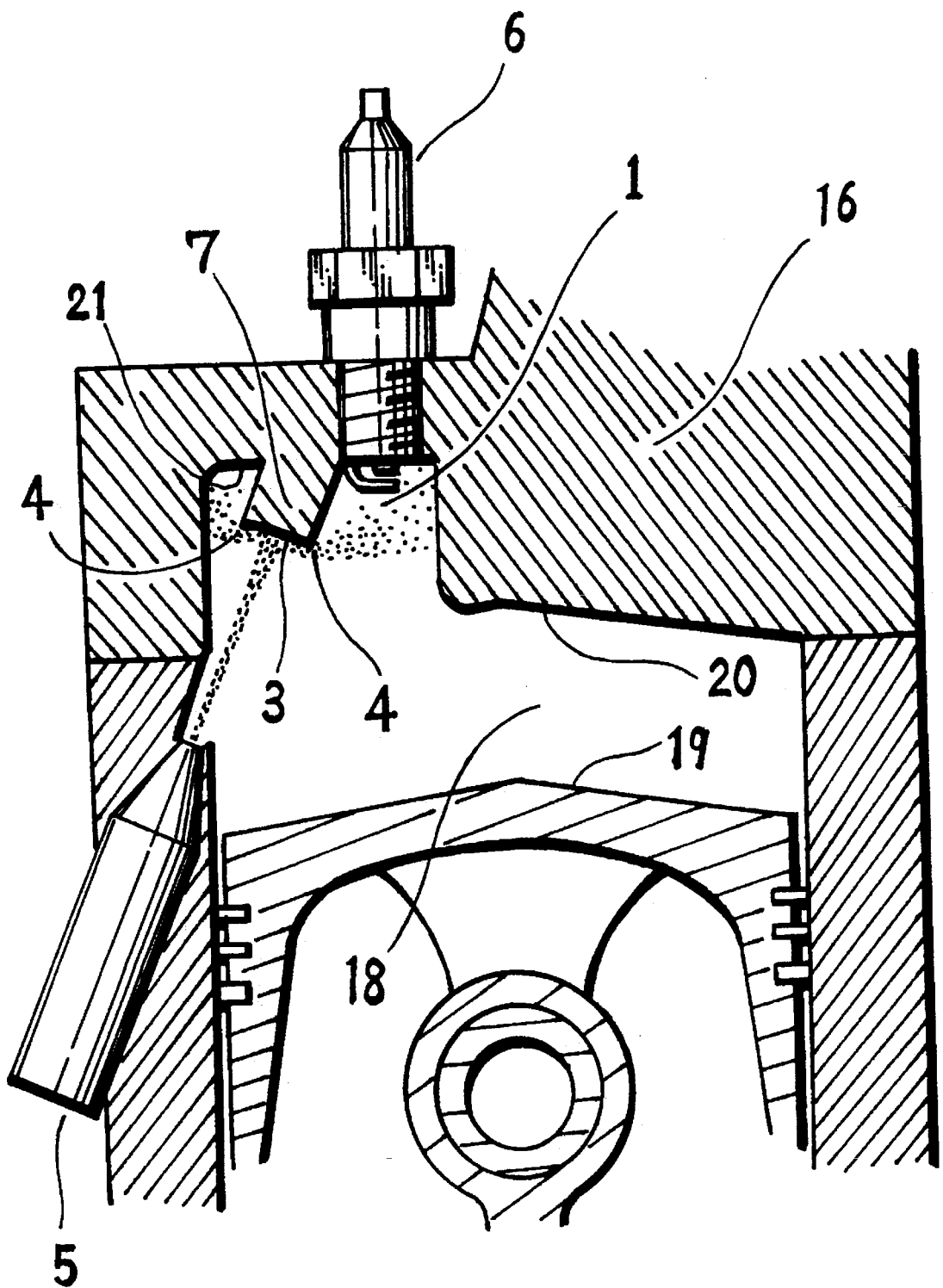
FIG. 5 is a cross sectional view of a preferred embodiment, where impingement part and impingement surface are protruding from the top of the main combustion chamber.

As a modification of this preferred embodiment, impinging part 7, impinging surface 3 and edge 4 can also be installed at the top wall 21 of the main combustion chamber, as shown in FIG. 5. The injector is again installed at the inner wall of the upper part of the cylinder. The fuel jet is directed obliquely towards the impingement surface 3.

Figure 6:
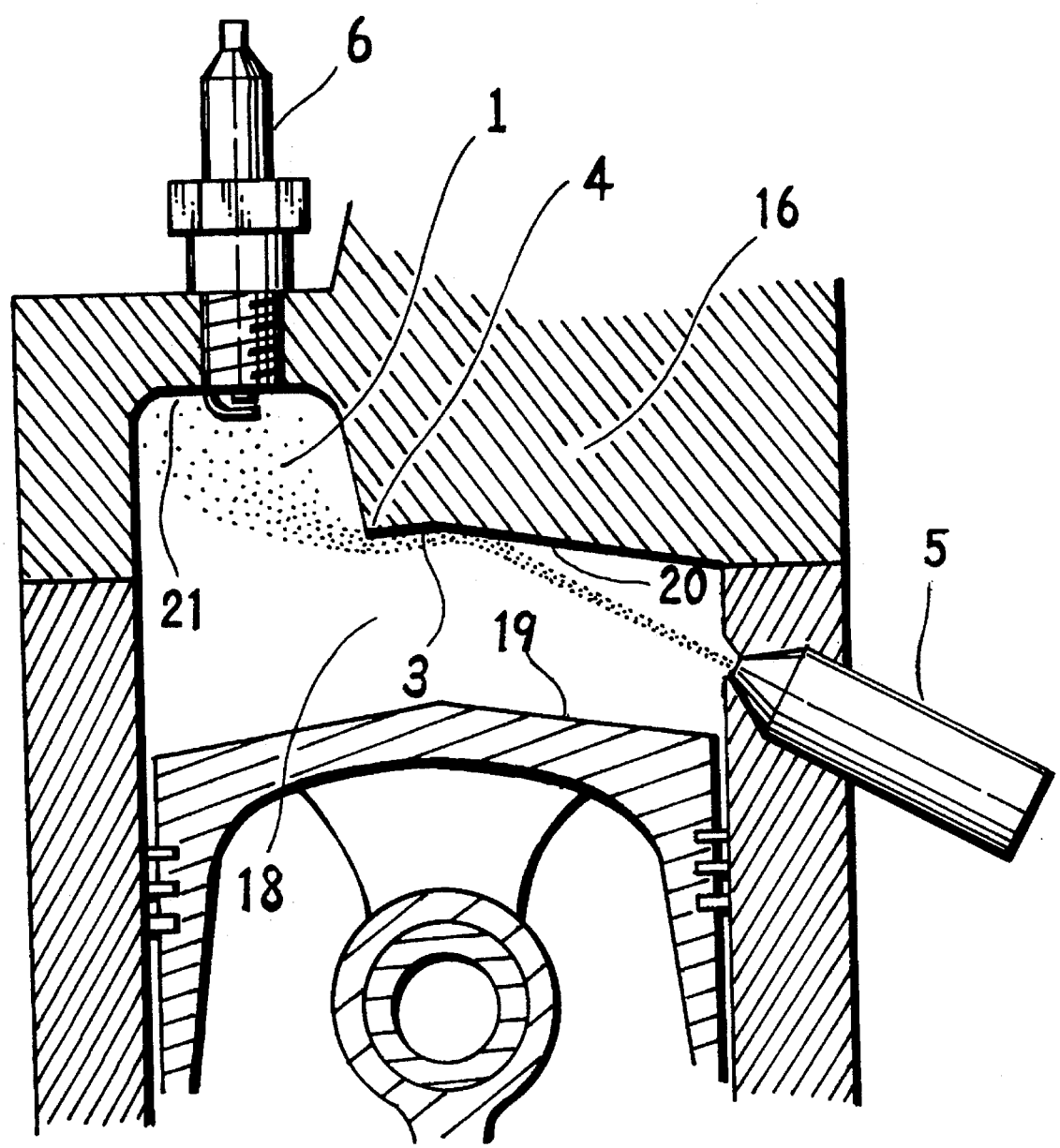
FIG. 6 is a cross sectional view of a preferred embodiment at fuel injection, where the impingement surface is made at the inner wall of the cylinder head at the squish area, which is locate near the main combustion chamber.

The impingement surface 3 can also be made at the cylinder head's inner wall 20 close to the main combustion chamber 1 which, at the end of the compression stroke, forms the squish area 2, as displayed in FIG. 6.

In this preferred embodiment, the edge 4 is made at the intersection of the main combustion chamber 1 and the impingement surface 3. The injector 5 is situated at the inner wall of the upper part of the cylinder, as above. Fuel is injected obliquely towards the impingement surface 3.

Figure 7:
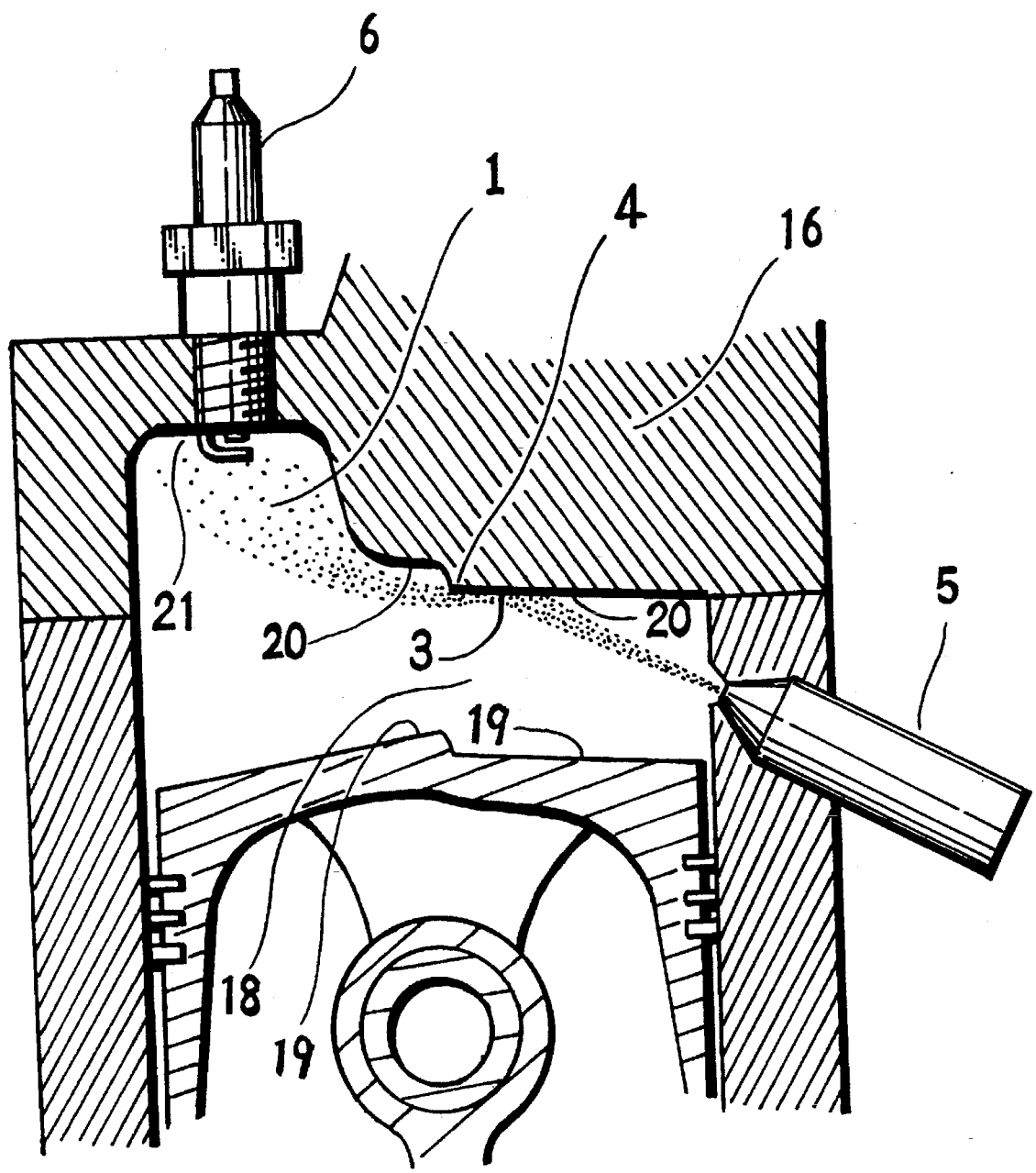
FIG. 7 is a cross sectional view of a preferred embodiment at fuel injection, where the impinging surface is made at the inner wall of the cylinder head at the squish area, which is located at a distance from the main combustion chamber.

As a modification of this preferred embodiment, the impingement surface 3 and its edge 4 can be located at the inner wall 20 of the cylinder head 16, at some distance from the main combustion chamber, as displayed in FIG. 7. In this case, a corresponding cavity is made in the top 19 of the piston which opposes the impingement surface and its edge.

Figure 8:
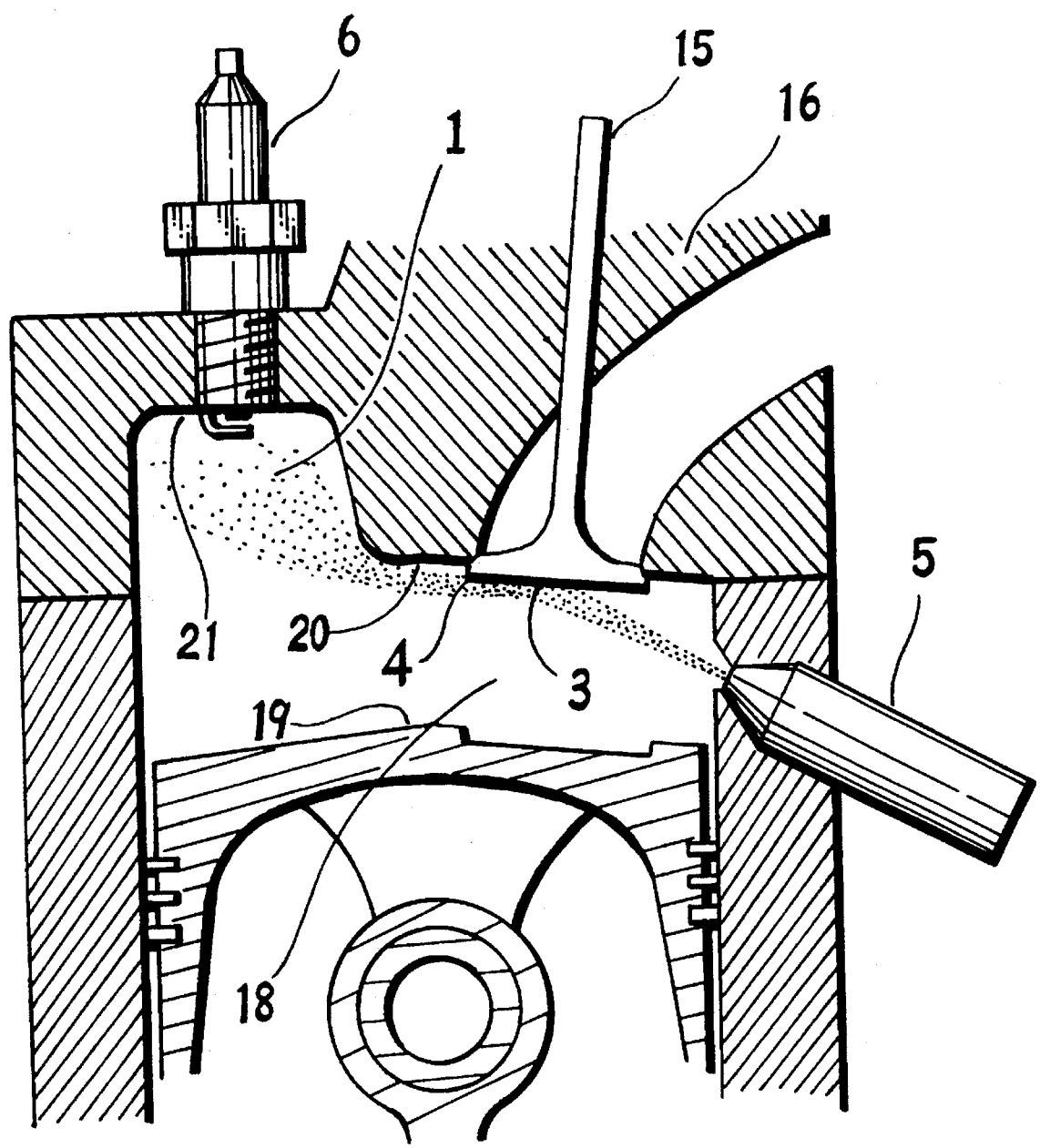
FIG. 8 is a cross sectional view of a preferred embodiment at fuel injection, where a valve installed at the squish area functions as an impingement surface.

As shown in FIG. 8, in these preferred embodiments a valve 15 can be installed at the squish area. The bottom of the valve then functions as an impingement surface 3. The edge 4 of the valve 15 is protruding slightly from the wall 20 of the cylinder head 16, in the vicinity of the valve, so that the fuel jet can disperse from this edge 4.

In summary, in the preferred embodiments from FIG. 1 to FIG. 8, the impingement surface and its edge is either protruding from one of the inner walls of the main combustion chamber 1, or else are made directly at the wall 20 of the cylinder head, forming the squish area.

Figure 9:
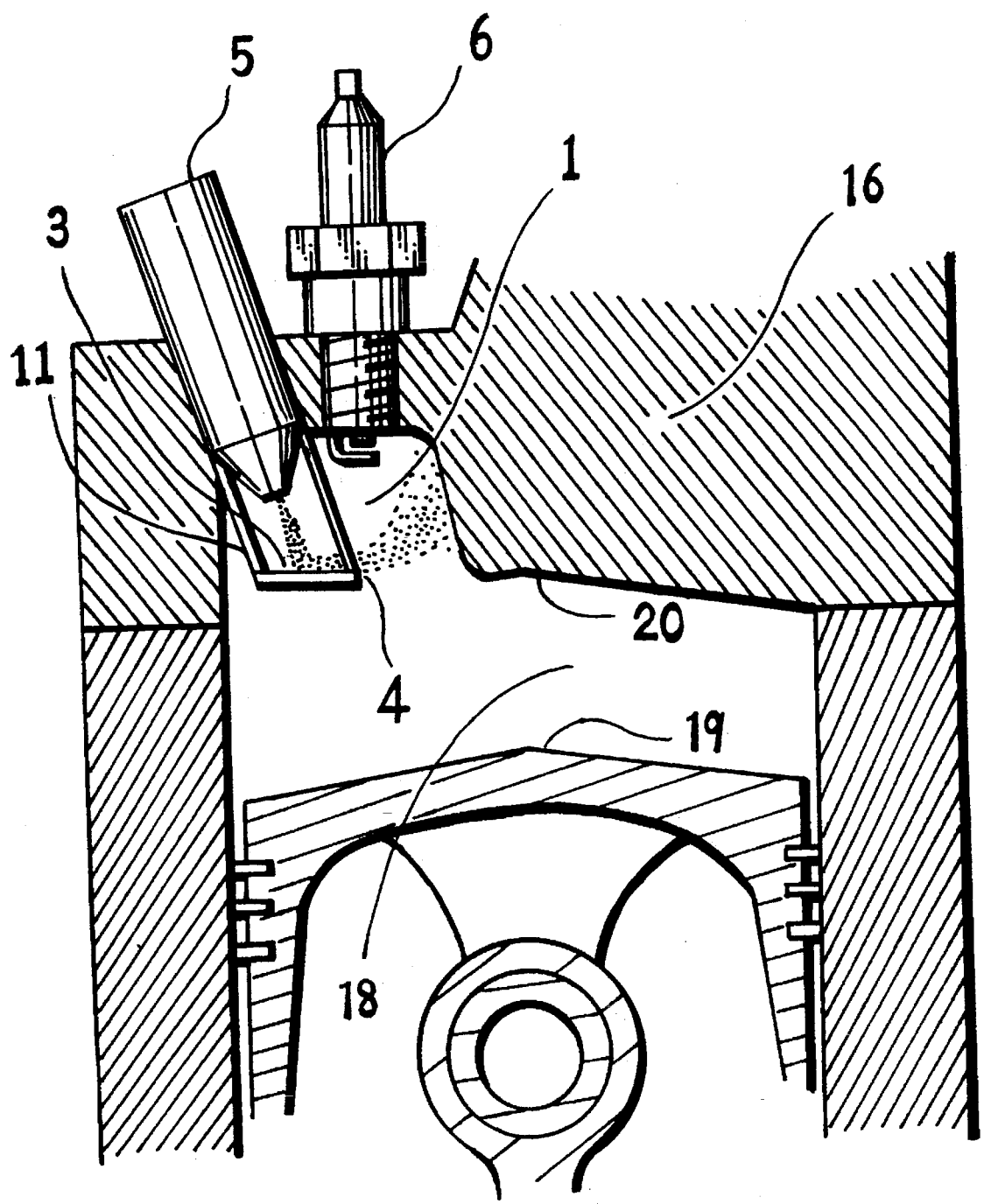
FIG. 9 is a cross sectional view of a preferred embodiment, where the impingement surface, fixed by several legs, is situated at the apex of the injector.

There is yet another modification where the impingement part is installed inside the main combustion chamber by use of several legs. In this preferred embodiment, displayed in FIG. 9, the injector 5 is protruding from one of the side walls of the main combustion chamber 1. The impingement surface 3 is fixed directly at the injector by use of several legs 11. As a modification, the impingement surface 3 can also be fixed, with several legs 11, directly at the inner wall of the main combustion chamber.

In the preferred embodiments as described above, either a single hole injector or a multiple hole injector is used as injector 5. In the latter case, several fuel jets are injected towards a relatively large impingement surface 3. Given that the injector can resist temperature and pressure conditions, various types—mechanical or electromagnetic—can be used.

Figure 10:
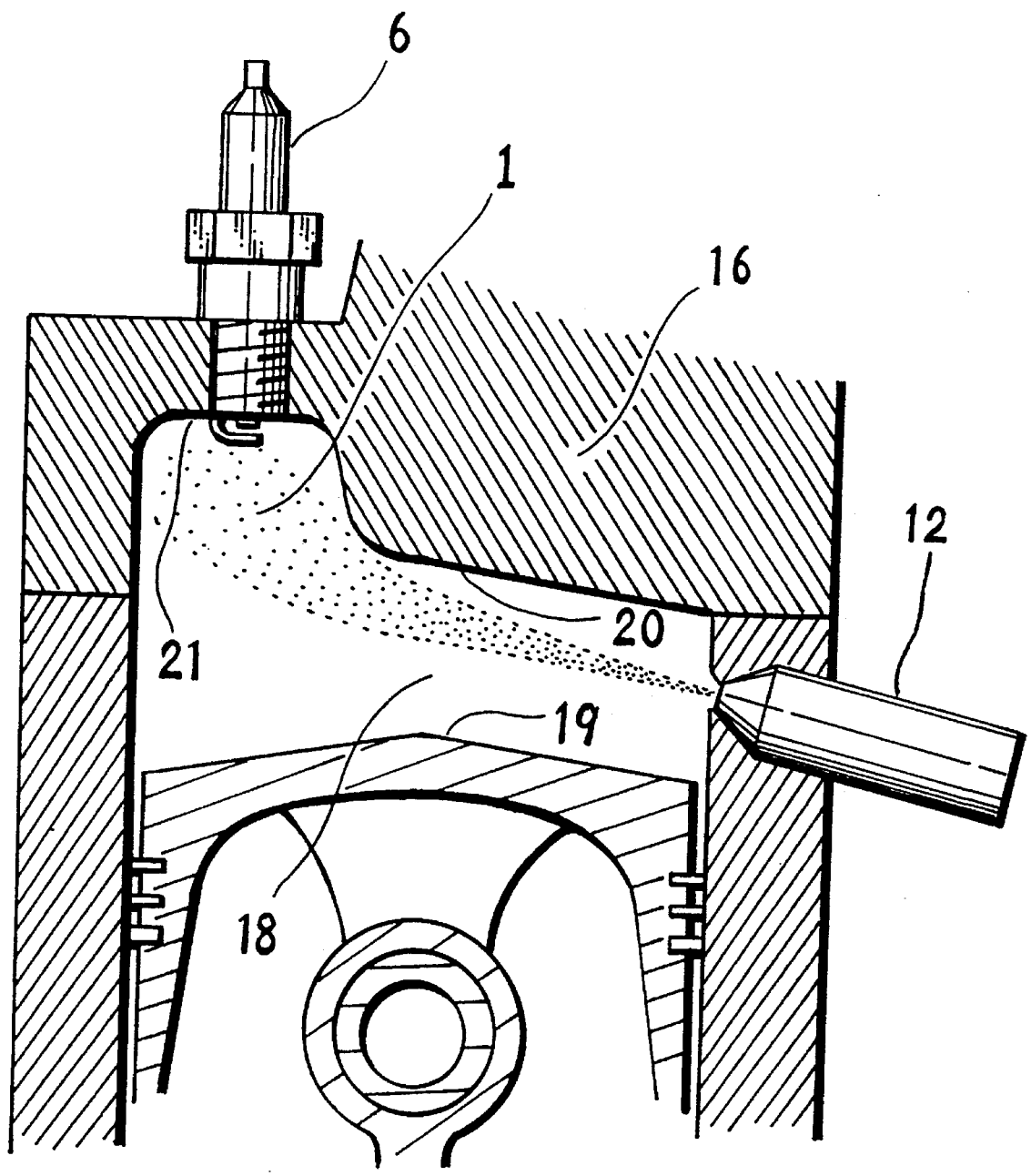
FIG. 10 is a cross sectional view of a preferred embodiment at fuel injection, where air and fuel are injected at the same time without making use of an impingement surface.

It is also possible to use injectors that inject fuel and air at the same time. Then, as shown in FIG. 10, the injector 12 is installed at an inner wall of the upper part of the cylinder. It should be mentioned, that in this case no fuel impingement is used.

If, by the working of air, an uneven dispersion of the fuel inside the upper part of the cylinder, concentrated around the main combustion chamber 1 is achieved, an air layer forms inside the cylinder below the fuel layer. Through the ascent of the piston, the unevenly dispersed fuel jet inside the cylinder near the main combustion chamber 1, flows easily into the main combustion chamber 1.

At ignition, an incombustible lean mixture layer is formed between the squish area 2 and the lower part of the main combustion chamber 1. Therefore, by the working of the squish flow and by churning, mixture formation at ignition is restricted to only the inside of the main combustion chamber 1.

As an example of an injector 12 where fuel and air are injected simultaneously, the injector produced by Orbital Engines CO. (Australia) can be mentioned.

In Pre-mixture combustion engines, where fuel Jet is delivered into the intake valves, if kerosene (which has a lower volatility than gasoline) is used, the engine oil at the side wall of the cylinder is diluted. In contrast, in the preferred embodiments explained as above, the fuel jet is not directed towards the cylinder side wall. Even if kerosene is used as fuel, the engine oil at the cylinder side wall is neither diluted nor worn away. Gasoline and kerosene, fuels with different octane values, can be properly used according to load.

In the preferred embodiments of FIG. 3, FIG. 5, FIG. 6, FIG. 7 and FIG. 8, if the fuel jet after impingement at the impingement surface 3 and its edge 4 is directed into the cylinder, an air layer is formed beneath the fuel jet, as in the preferred embodiments of FIG. 10, and mixture formation is restricted to the main combustion chamber 1, as in the preferred embodiment of FIG. 1.

In the preferred embodiments of FIG. 1, FIG. 2, FIG. 3, FIG. 4, FIG. 5 and FIG. 9, as well as in OSKA, the impingement part is protruding considerably into the main combustion chamber 1, and the thermal load of the impingement part is high. In contrast, in the preferred embodiments of FIG. 6, FIG. 7, and FIG. 8, where the impingement surface is formed at the squish area, the edge 4 of the impingement surface 3 is made only at one side of the impingement surface. Thermal load in these embodiments is lower than in OSKA, where the edge 4 is made around the whole of the impingement surface 3. The same holds, of course, for the preferred embodiment of FIG. 10, where no impingement surface is used.

Second, we will discuss preferred embodiments with several main combustion chambers.

In OSKA, if several combustion chambers are made into the top of the piston, the piston becomes heavier. In the present invention, no similar problem exists. Several main combustion chambers 1 and several spark plugs 6 can be made into the inner wall of the cylinder head 16.

If several main combustion chambers 1 are installed in one cylinder, combustion time is shorter than in the preferred embodiments presented above, because of the smaller volume of the individual combustion chambers. Accordingly, higher compression ratios are realized and anti-knocking quality is increased.

Figure 11:
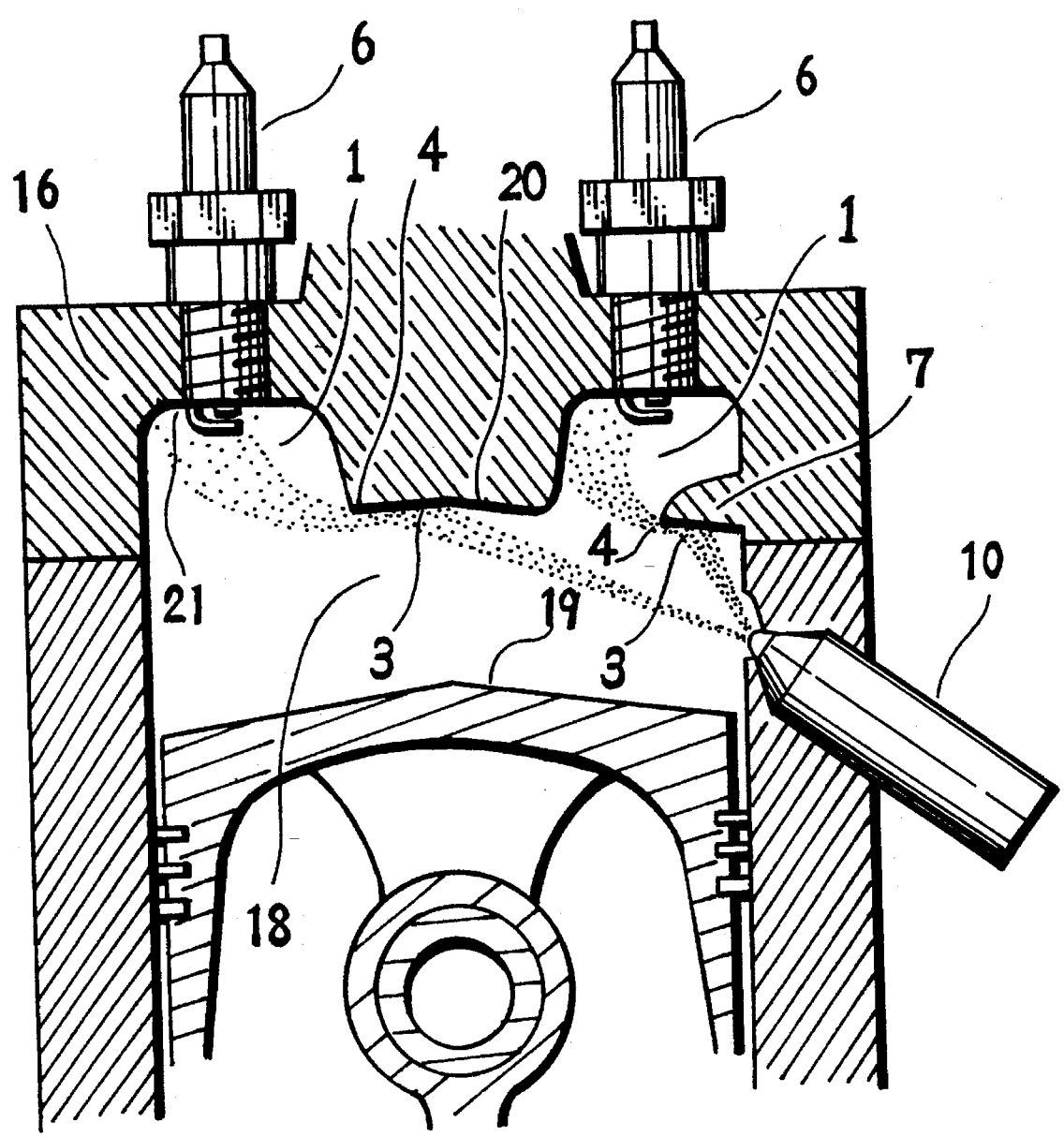
FIG. 11 is a cross sectional view of a preferred embodiment, where the main combustion chambers of the preferred embodiments of FIG. 4 and FIG. 6 are combined.

An example of a preferred embodiment, where the main combustion chambers of the preferred embodiments of FIG. 4 and FIG. 6 are combined, is shown in FIG. 11. If a multiple hole injector 5 is used in this preferred embodiment, several combinations of the main combustion chambers of the embodiments in FIG. 4, FIG. 5, FIG. 6, FIG. 7, FIG. 8 and FIG. 10 are possible. Between each two main combustion chambers, a squish area 2 is made.

Figure 12:
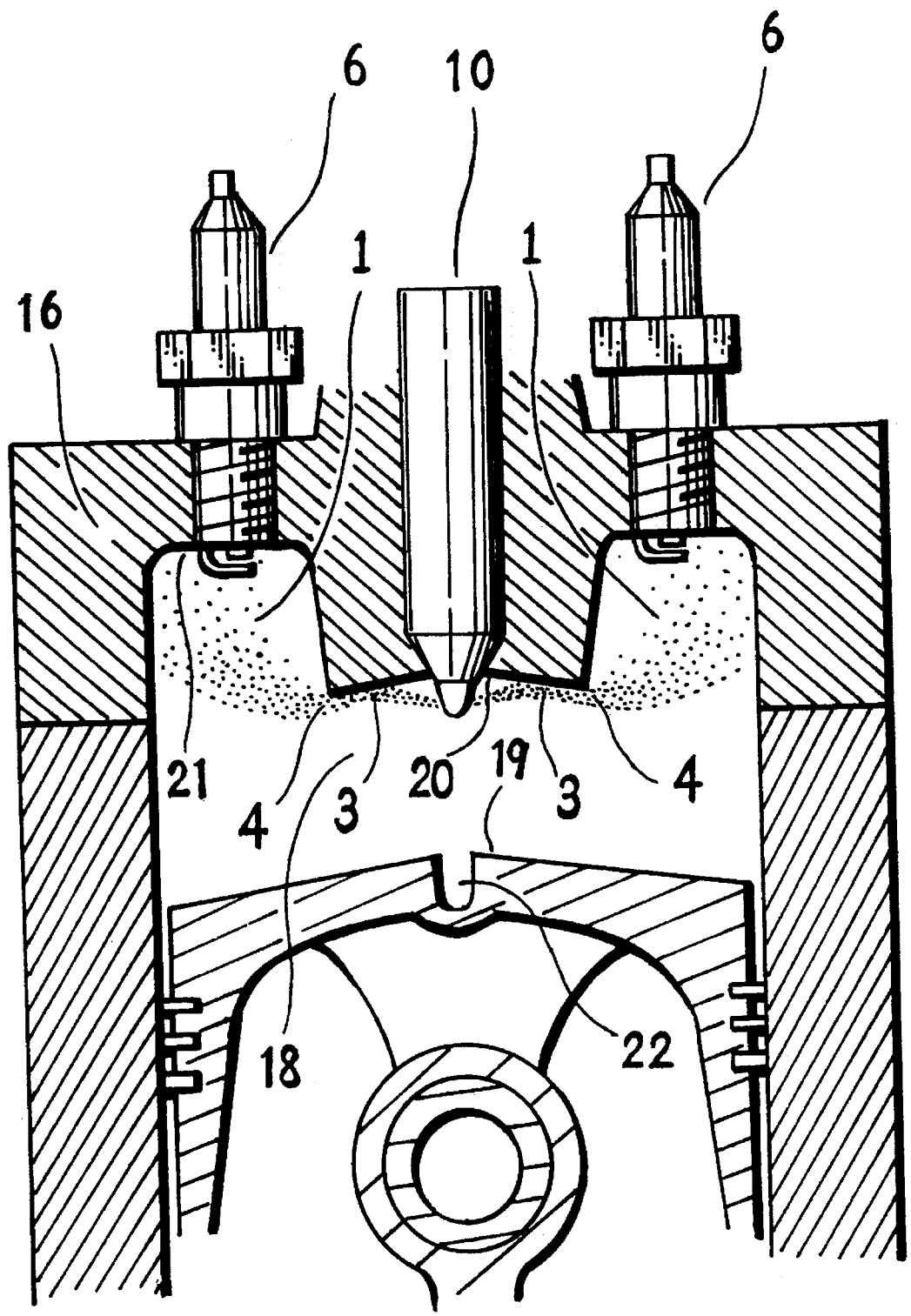
FIG. 12 is a cross sectional view of a preferred embodiment with a multi-hole injector, located at the center of the cylinder heads inner wall, and several main combustion chambers.

A multiple hole injector can also be installed at the inner wall 20 of the cylinder head 16, near the main axis of the cylinder, as shown in FIG. 12. In this case, between the injector 10 and the main combustion chambers, impinging surfaces are made. The tip of the injector 10, with the injection holes, is protruding from the inner wall of the cylinder head. A corresponding cavity 22 has to be made into the top of the piston. Squish areas are made between the inner wall 20 of the cylinder head and the top 19 of the piston.

The thermal load of the impingement part 3 and its edge 4 are lower in the preferred embodiments of FIG. 12, than in OSKA, as impingement surface 3 and edge 4 are formed in only one direction. If the wall 20 of the cylinder head around the multiple hole injector 10 is shaped concavely, no cavity 22 has to made into the top of the piston.

Figure 13:
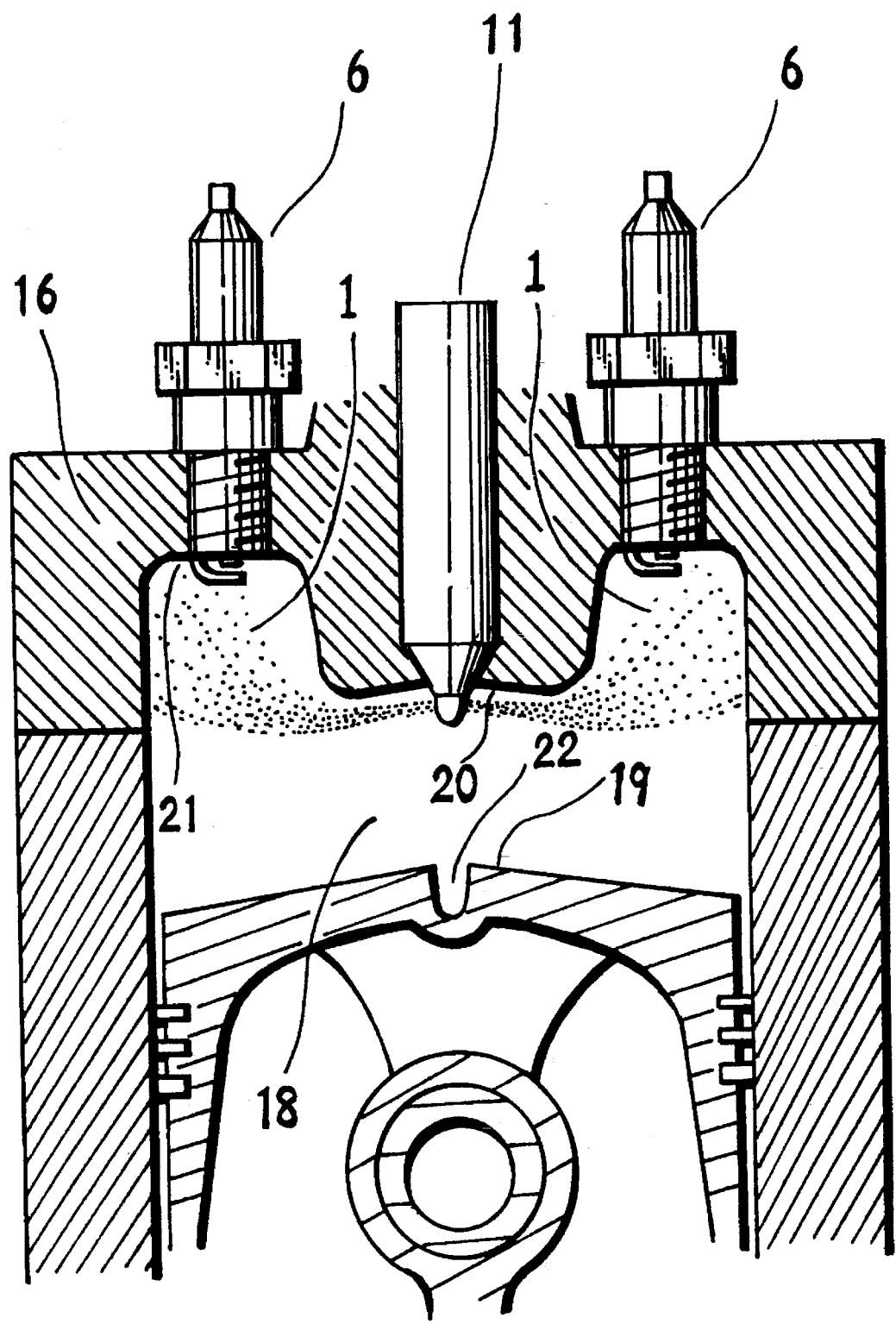
FIG. 13 is a cross sectional view of a preferred embodiment where the multi-hole injector of the preferred embodiment in FIG. 12 is replaced by a multi-hole injector injecting fuel and air at the same time.

If a multi-hole injector 11 where fuel and air are injected at the same time is used, impingement surface 3 and edge 4 are no more necessary, as shown in FIG. 13.

In the preferred embodiments displayed from FIG. 1 to FIG. 13, inlet valves can be installed either inside the main combustion chambers or outside.

We will now discuss a preferred embodiment, where the main combustion chamber is extending into the cylinder head, beyond the side walls at the inside of the cylinder.

If inlet and exhaust valves in Pre-Mixture Combustion Engines are installed outside the region marked by the inner walls on the cylinder, the combustion time is increased and, accordingly, the anti knocking quality of the engine decreased.

Figure 14:
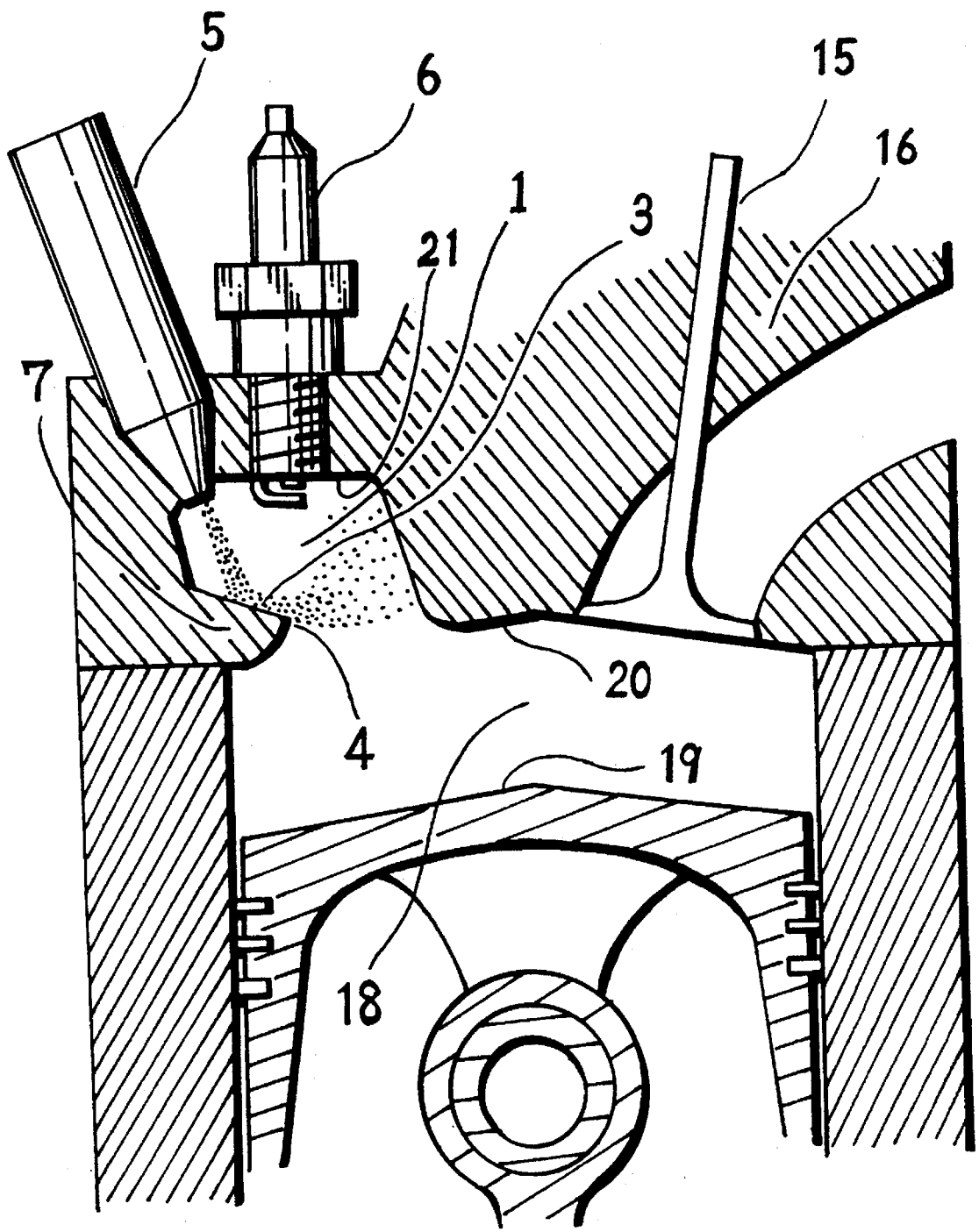
FIG. 14 is a cross sectional view of a preferred embodiment, where the main combustion chamber is extending into the cylinder head beyond the inner wall of cylinder.

In FIG. 14 a preferred embodiment is shown, where the main combustion chamber 1 is extending into the cylinder head beyond the area marked by the cylinders side wall. Anti knocking quality can be increased, however, if the distance between the various side walls and the electrode of the spark plug is kept below the radius of the cylinder.

The square measure for installing inlet valves is now higher than in the preferred embodiment described in FIG. 1, resulting in higher inlet efficiencies at high speed rotation.

Finally, we discuss the spark plug 6.

In the present invention, at ignition and under full load condition, the above mentioned layer 8 with a lean air-fuel ratio is located at the bottom of the main combustion chamber 1. The mixture layer is located above this lean mixture layer 8.

If the spark plug 6 can be installed at the above mentioned mixture layer, in all preferred embodiments as described above, a spark plug with a normal electrode can be installed at random at one of the inner walls of the main combustion chamber 1 at the cylinder head 16. A spark plug with a protruding electrode is also possible.

If a normal electrode is used, the thermal load of the electrode of the spark plug 6 can be kept lower than in OSKA, where a spark plug with a protruding electrode is used.

However, in the versions of the preferred embodiments, as explained above, where overhead valves are used, the following problem exists: If the spark plug 6 is installed at the top 21 of the main combustion chamber, a lighter construction of the piston than in OSKA is realized, but the space left for the installation of inlet valves is smaller than in OSKA.

Figure 15:
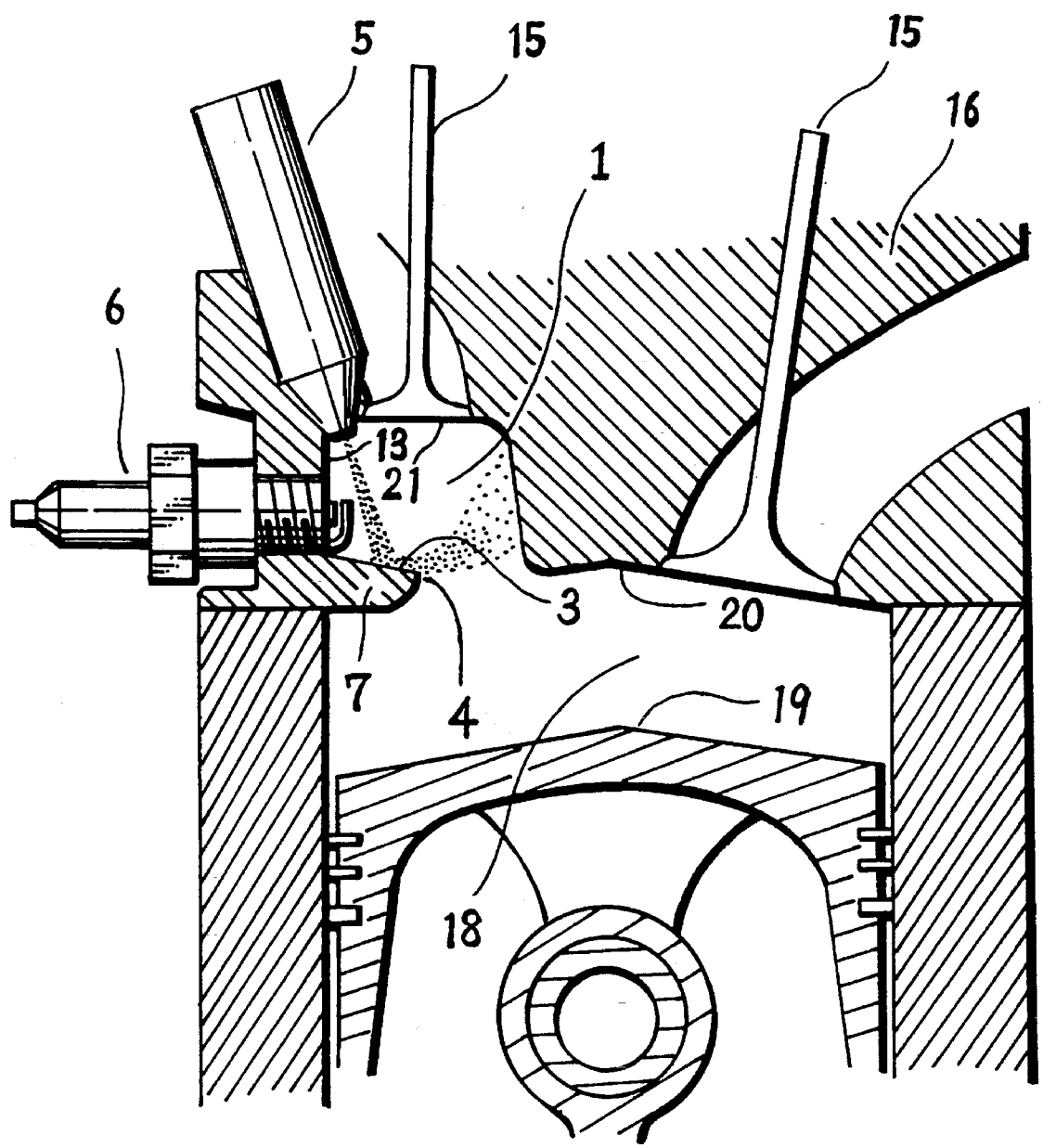
FIG. 15 and FIG. 16 are cross sectional views of a preferred embodiments, where one or more valves are installed at the top of the main combustion chamber, and where the electrodes of the spark plug are installed at the combustion chambers inner wall aligned with the side wall of the cylinder.
Figure 16:
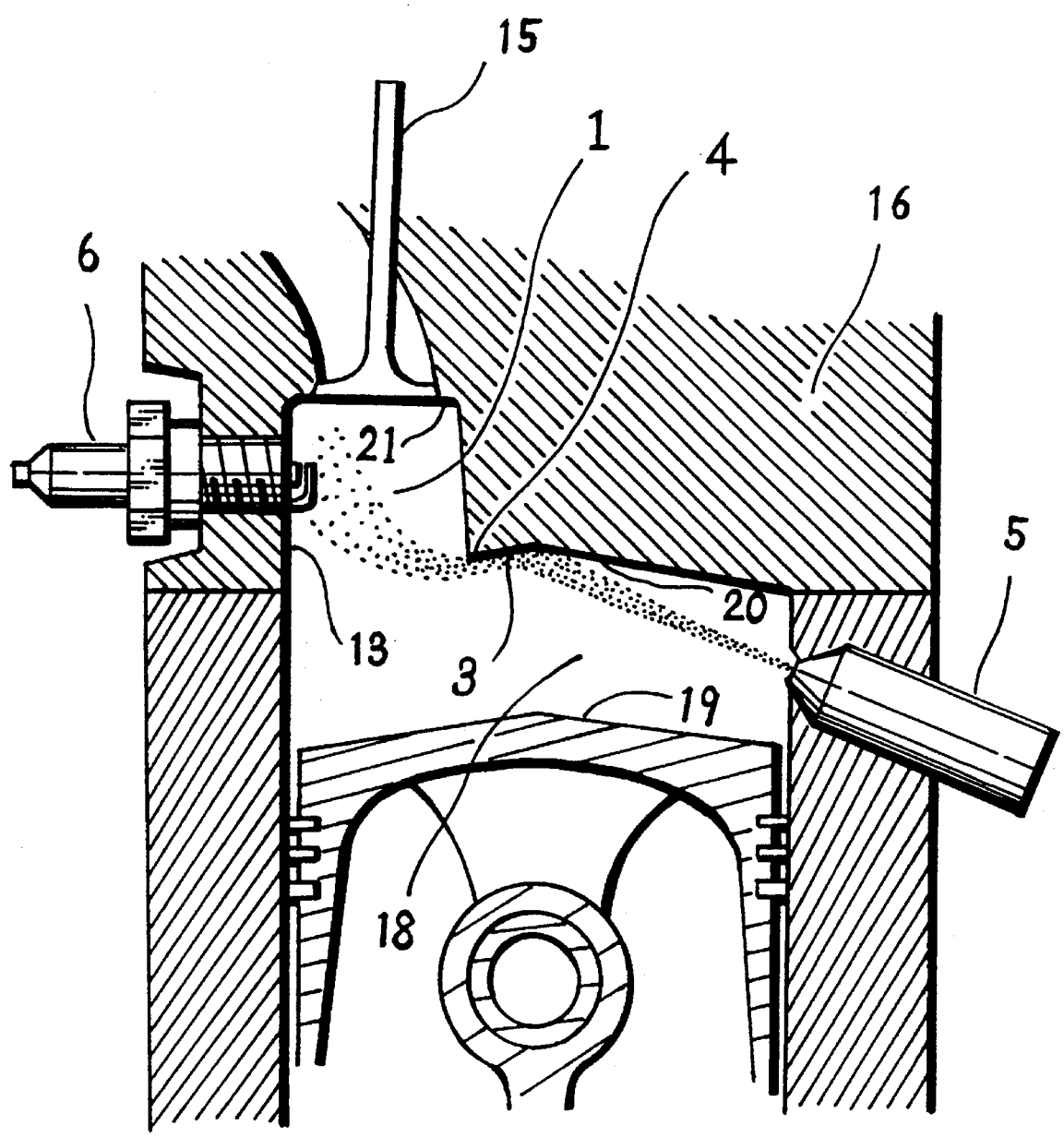
Figure 17:
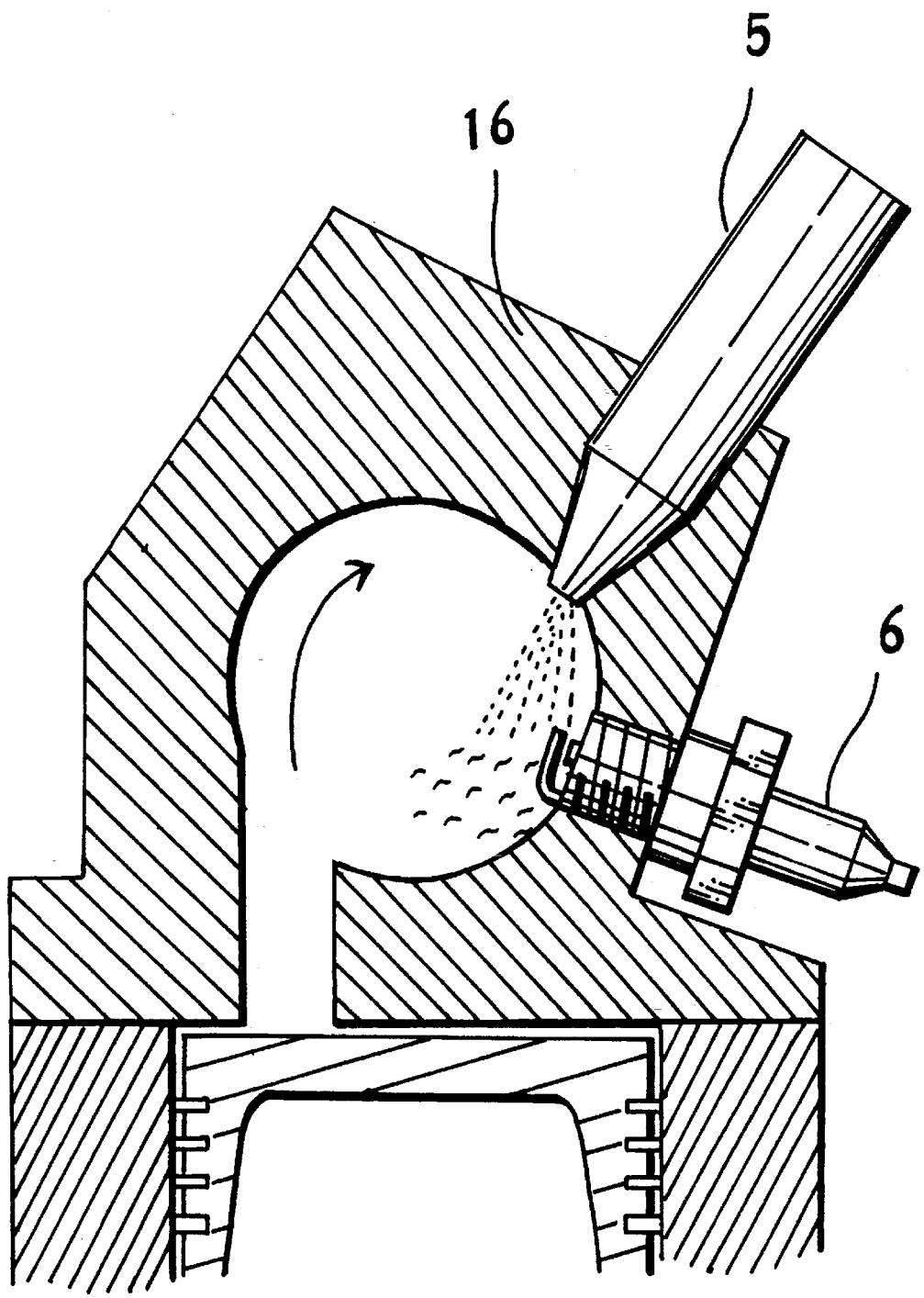
FIG. 17 is a cross sectional view of Texaco-type combustion chamber.
Figure 18:
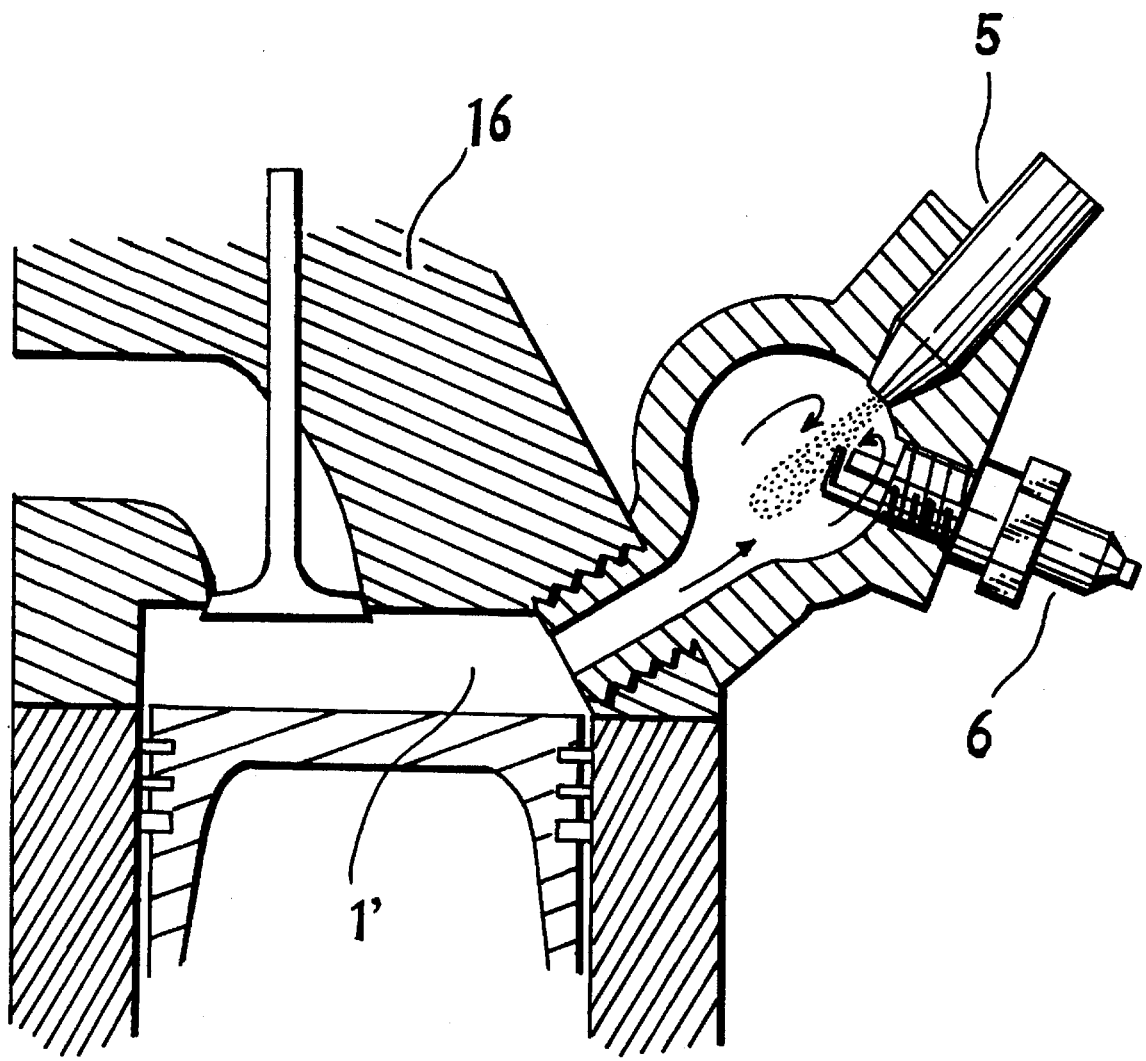
FIG. 18 is a cross sectional view of a Watanabe-type combustion chamber.
Figure 19:
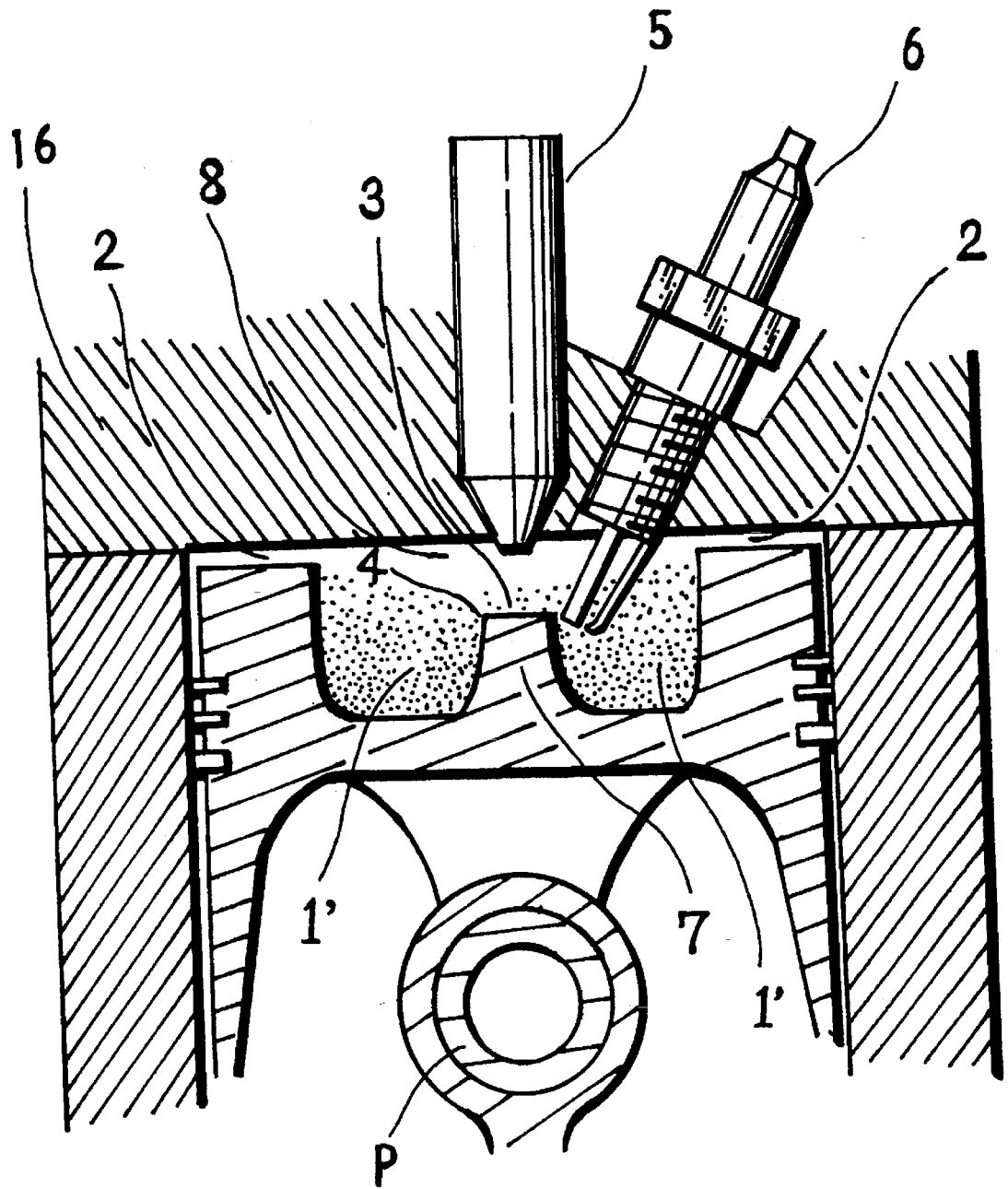
FIG. 19 is a cross sectional view explaining the construction and the working of OSKA at ignition.
Figure 20:
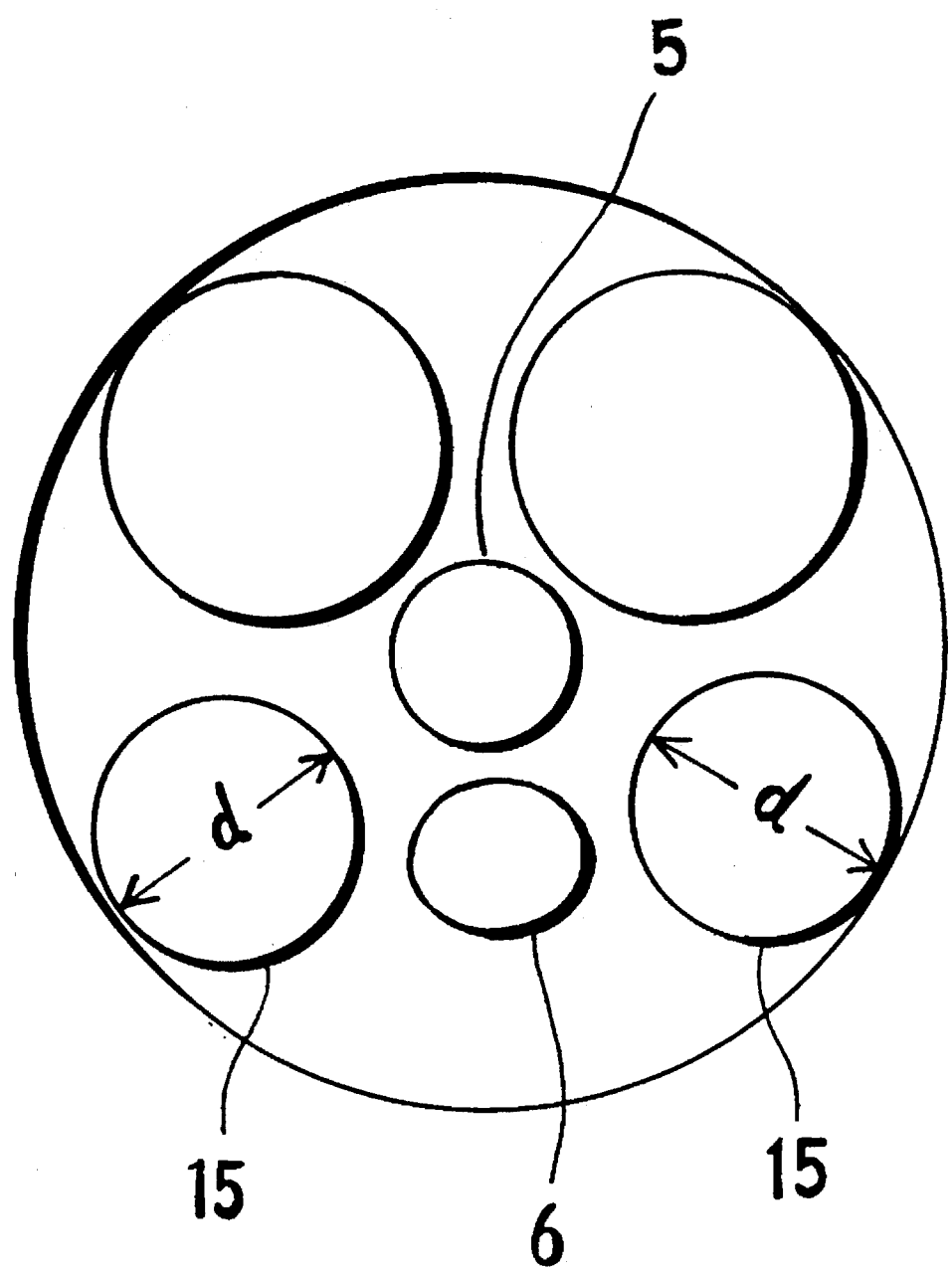
FIG. 20 is a plan of the arrangement of valves on the underside of the cylinder head of OSKA.
Figure 21:
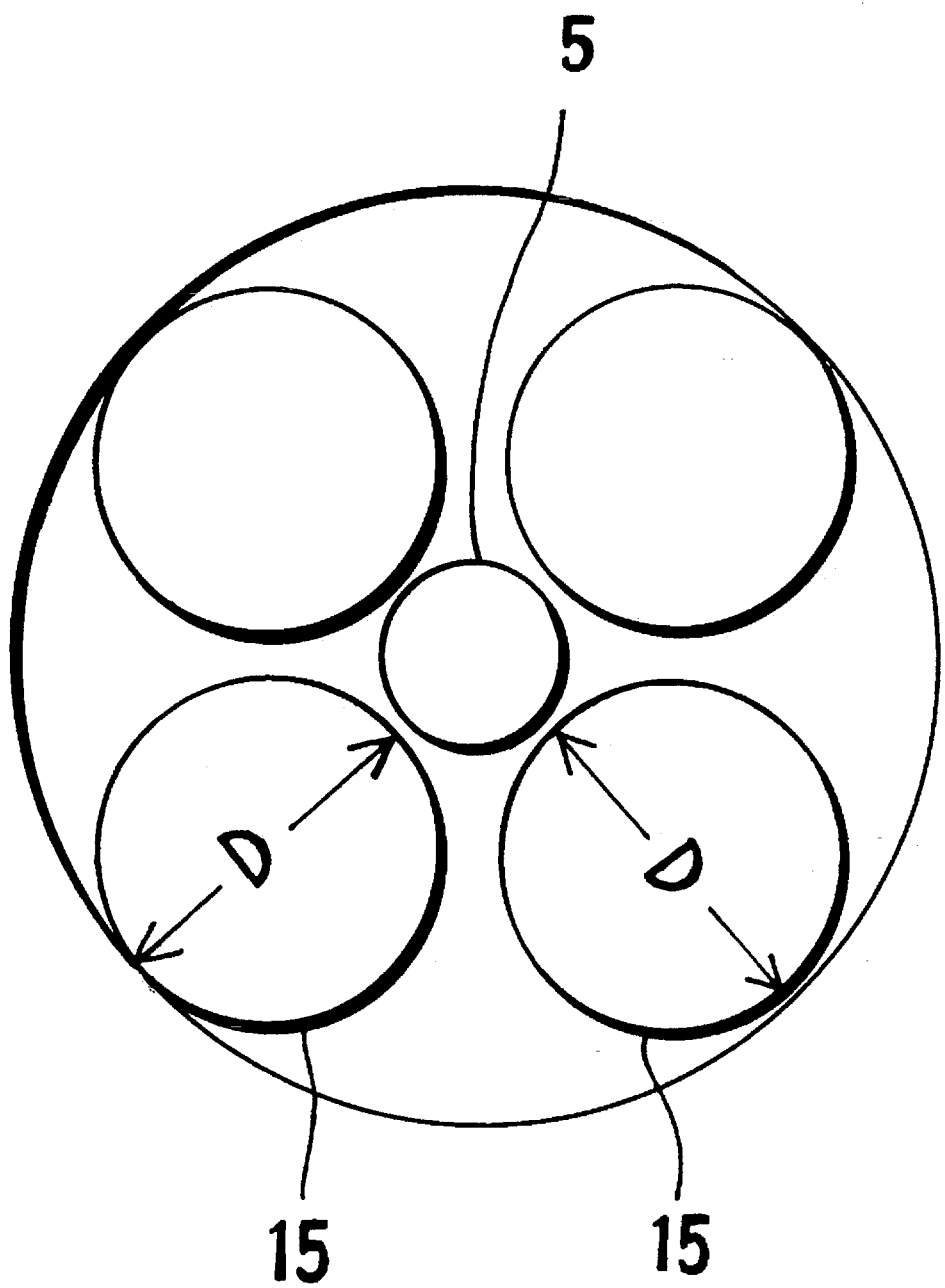
FIG. 21 is a plan of the arrangement of valves on the underside of the cylinder head of Pre-Mixture Combustion Engines.

This problem can be solved by the following modification of the preferred embodiments: The main combustion chambers are made at the periphery of the cylinder heads inner wall 20. Valves 15 are installed at the top 21 of the main combustion chamber 1. The spark plug is installed at the side wall 13 of the main combustion chamber 1 that is aligned with the cylinders side wall. With these modification, a square surface for valve installation comparable to OSKA is achieved. As the piston is lighter in the preferred embodiment than in OSKA, speed and output are increased. Examples are shown in FIG. 15 and FIG. 16.

Knocking is a phenomenon that develops mainly at full load. In all preferred embodiments discussed above, knocking is prevented by layered combustion at full load condition. But what about low load? At low load, either intake regulation by use of a throttle valve and pre-mixture combustion, or layered combustion are possible.

To realize layered combustion inside the main combustion chamber 1 at low load, the time interval between the beginning of fuel injection and ignition has to be shorter than at full load. In this case, the squish flow at the beginning of fuel injection is limiting diffusion of the fuel jet after impingement to the area of the main combustion chamber, in the vicinity of the cylinders main axis. A mixture layers is developing and air layers are formed above and below the mixture layer.

If the electrode of the spark plug 6 is installed at the mixture layer, ignition at minimum load and with low quantities of injected fuel is possible.

What we claim is:

1. A direct fuel injection stratified charge engine comprising:

a cylinder block defining a cylinder;

a piston located in said cylinder;

a cylinder head on said cylinder block; said cylinder head defining a squish surface facing said piston, and a pocket defining a main combustion chamber facing said piston;

a spark plug in said main combustion chamber, wherein the greatest spacing between electrodes of the spark plug and any portion of said pocket is less than the radius of said cylinder; and a fuel injector disposed in one of said head and block, said fuel injector adapted to direct a stream of fuel to obliquely deflect off a surface of said cylinder head adjacent said main combustion chamber and then into said main combustion chamber.

2. The direct fuel injection stratified charge engine as claimed in claim 1, further comprising a projection formed on an inner wall of said main combustion chamber, said fuel from the fuel injector impinging a surface of said projection and being dispersed from an edge of said surface.

3. The direct fuel injection stratified charge engine as claimed in claim 1, further comprising an edge formed on an inner wall of said cylinder head where the squish surface forms, said fuel from the fuel injector impinging said inner wall and being dispersed from said edge.

4. The direct fuel injection stratified charge engine as claimed in claim 3, wherein an intersection of said edge is made at said main combustion chamber and the surface.

5. The direct fuel injection stratified charge engine as claimed in claim 1, wherein a plurality of said main combustion chambers are installed in parts of said inner wall of said cylinder head in one cylinder;

further squish surfaces are made between said plurality of main combustion chambers; and a multiple hole injector is installed at an inner wall which faces an upper portion of a space in said cylinder excluding said main combustion chambers.

* * * * *